Jan. 14, 1958 S. H. BAREFOOT ET AL 2,819,827
MATERIAL SPREADER
Filed Feb. 23, 1955 2 Sheets-Sheet 1
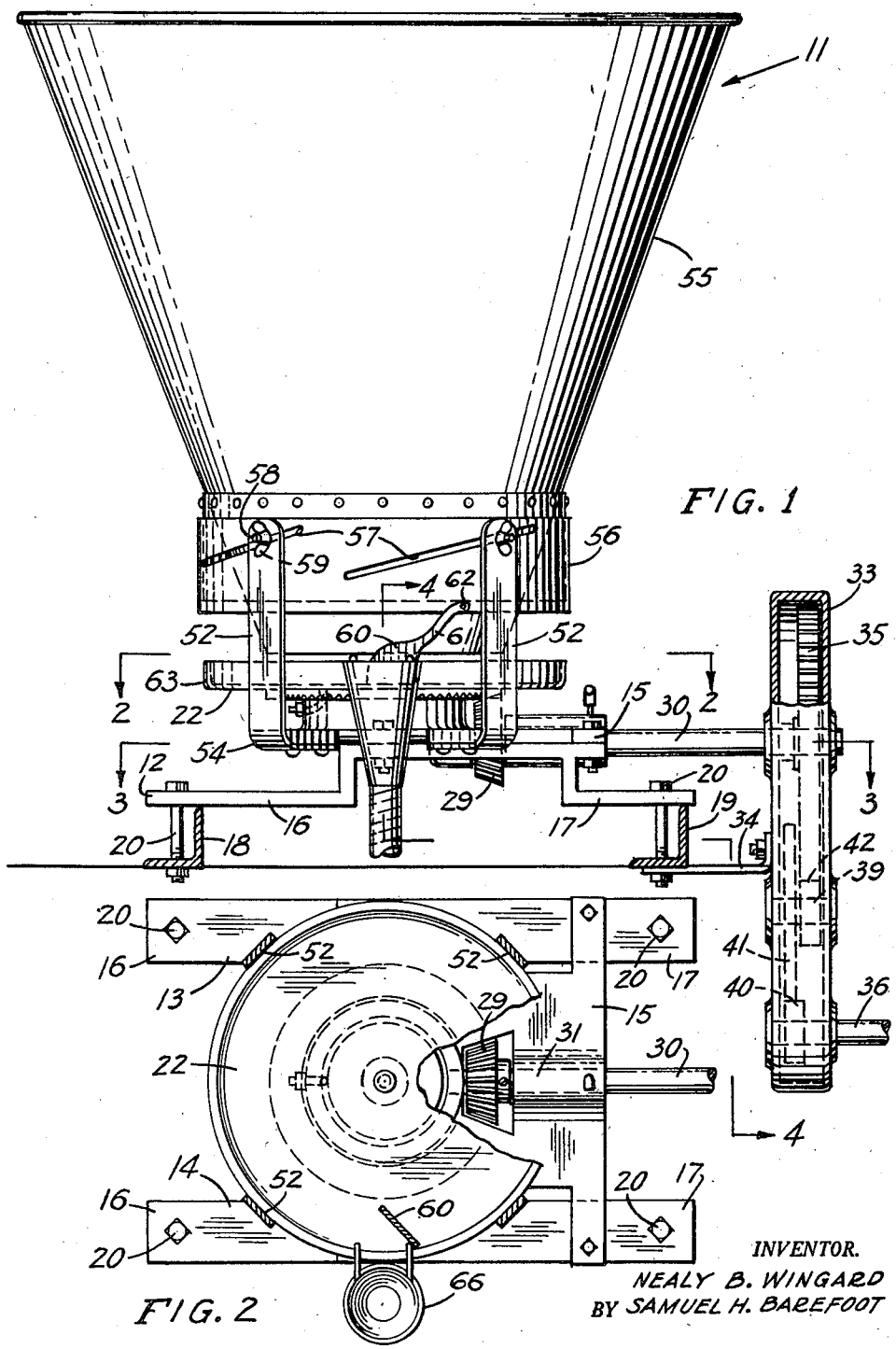
INVENTOR.
NEALY B. WINGARD
BY SAMUEL H. BAREFOOT
McMorrow, Berman & Davidson
ATTORNEYS Jan. 14, 1958 S. H. BAREFOOT ET AL 2,819,827
MATERIAL SPREADER Filed Feb. 23, 1955 2 Sheets-Sheet 2

INVENTOR.
NEALY B. WINGARD
BY SAMUEL H. BAREFOOT

McMorrow, Berman & Davidson
ATTORNEYS

United States Patent Office 2,819,827
Patented Jan. 14, 1958

2,819,827

MATERIAL SPREADER

Samuel H. Barefoot and Nealy B. Wingard, Gilbert, S. C.

Application February 23, 1955, Serial No. 489,988

2 Claims. (Cl. 222—286)

This invention relates to agricultural equipment, and more particularly to an improved material spreading attachment for a farm tractor.

A main object of the invention is to provide a novel and improved material spreading attachment for a tractor, said attachment being simple in construction, being easy to mount on a tractor, and being adjustable to provide a desired rate of discharge of material from the device.

A further object of the invention is to provide an improved spreader for material, such as fertilizer or the like, adapted to be operated by and mounted on a farm tractor, the device involving inexpensive components, being durable in construction, and providing a considerable saving in the time and labor required to spread material such as fertilizer or the like.

Further objects and advantages of the invention will become apparent from the following description and claims, and from the accompanying drawings, wherein:

Figure 1 is a side elevational view, partly in vertical cross section, of an improved material spreading attachment according to the present invention, shown mounted on the frame of a tractor, the frame elements being shown in vertical cross section.

Figure 2 is a horizontal cross sectional view taken on the line 2—2 of Figure 1, with a portion of the structure broken away.

Figure 3:
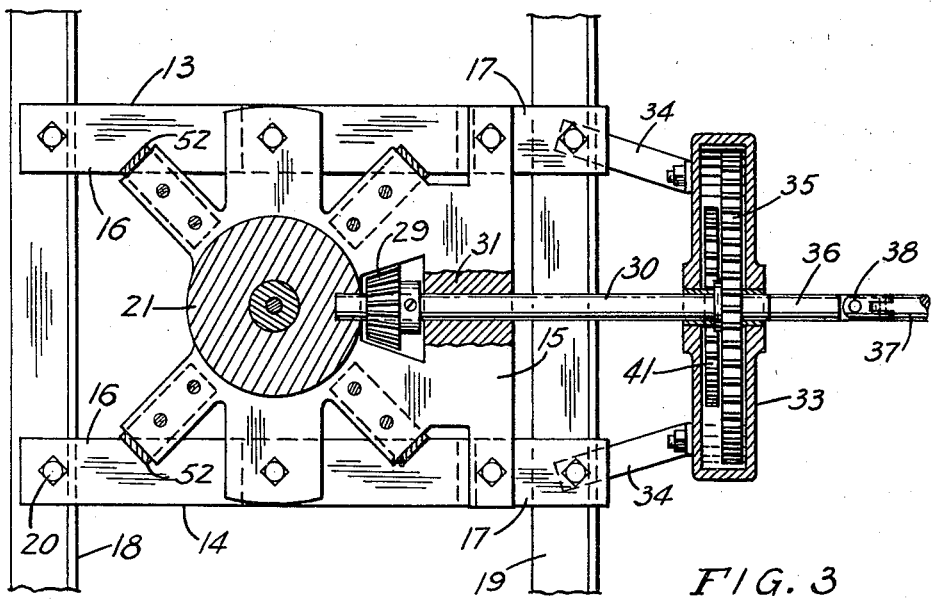
Figure 3 is a horizontal cross sectional view taken on the line 3—3 of Figure 1.

Referring to the drawings, 11 generally designates an improved material spreader attachment, said attachment comprising a frame 12. The frame 12 comprises the parallel side bars 13 and 14 which are connected by the transverse horizontal plate member 15. The side bars 13 and 14 have the downwardly offset end portions 16 and 17 which are supported on the upstanding flanges of the tractor longitudinal frame members 18 and 19, as shown in Figure 1, and which are secured to said frame members by the fastening bolts 20.

Figure 4:
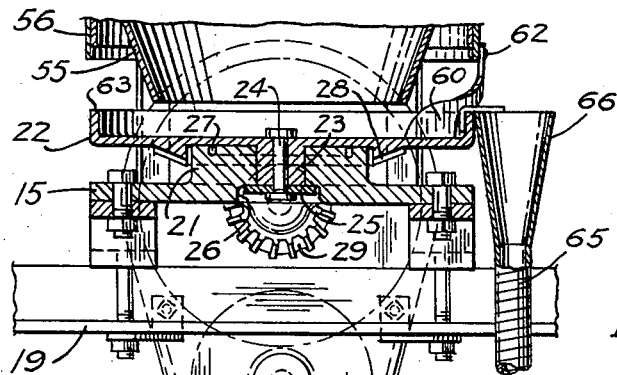
Figure 4 is a vertical cross sectional view taken on the line 4—4 of Figure 1.

Formed integrally on the plate member 15 between the side bars 13 and 14 is the large, upstanding circular bearing stud 21. Designated at 22 is a circular trough member which is mounted rotatably on the bearing stud 21 and which is formed with the central depending shaft portion 23 which extends through a central aperture formed in the bearing stud 21. A fastening rivet 24 extends centrally through the shaft member 23 and through a retaining washer 25 disposed against the bottom end of the shaft member 23 and against the top wall of a recess 26 formed centrally in the bottom surface of the plate 15 to receive the washer 25, as shown in Figure 4.

The top surface of the stud 21 is formed with an annular oil groove 27 to receive lubricant and to facilitate the rotation of the circular trough 22 on the upstanding stud 21.

The circular trough 22 is formed around the stud 21 with the depending bevel gear teeth 28 (Figure 4) which are in meshing engagement with a bevel gear 29 secured on a horizontal shaft 30 extending rotatably through a bearing sleeve member 31 integrally formed on the plate member 15, as shown in Figure 2.

The shaft 30 extends through a vertical gear housing 33 which is secured by means of suitable brackets and the fastening bolts 20 to the adjacent tractor longitudinal frame member 19, as shown in Figures 1 and 3. Journaled in the lower portion of the gear housing 33 is a shaft 36 to which is connected a shaft section 37, as by a universal point 38. Journaled in the housing 33 between the shafts 30 and 36 is an intermediate shaft 39. Shaft 36 carries a relatively small gear 40 which meshes with a larger gear 41 mounted on shaft 39. Shaft 39 carries a smaller gear 42 which meshes with a relatively large gear 35 mounted on the shaft 30, whereby the shaft 36 is drivingly coupled to the shaft 30, and whereby a substantial speed reduction is obtained between shaft 36 and shaft 30. Furthermore, shaft 30 is coupled drivingly to the horizontal trough 22, with a further speed reduction, since the driving bevel gear 29 is relatively small as compared with the gear defined by the annular depending ring gear structure 28 on the bottom surface of the circular trough 22.

Figure 5:
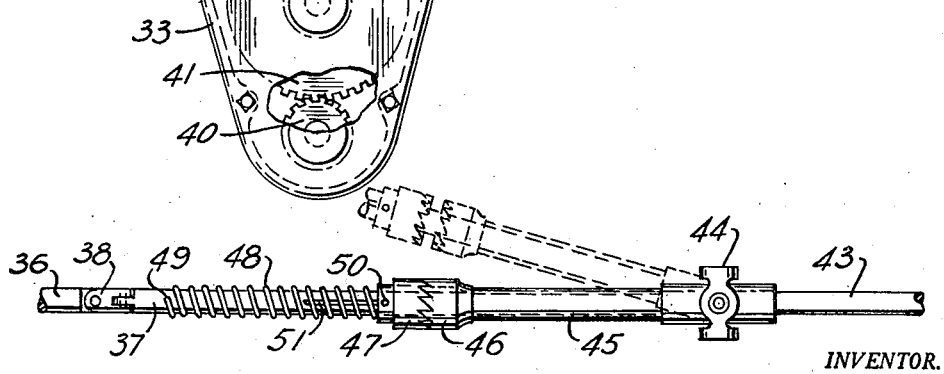
Figure 5 is a fragmentary side elevational view of the shaft means for connecting the spreader to the power takeoff shaft of a tractor and showing the manner in which the shaft means is disconnected from the power takeoff shaft responsive to the elevation of the device.

A shaft 43 is connected to the power takeoff shaft of the tractor and is connected by a universal joint 44 to a sleeve member 45 which slidably receives the end portion of the shaft section 37. The sleeve member 45 carries the clutch sleeve 46, and slidably mounted on the shaft section 37 is a mating clutch sleeve 47 which is biased into coupling engagement with the clutch sleeve 46 by a coiled spring 48 having one end secured to the shaft section 37 at 49 and bearing on the clutch sleeve 47 at its opposite end, as shown in Figure 5. The clutch sleeve 47 is provided with the transverse pin 50 extending therethrough and through a longitudinal slot 51 in the shaft section 37, whereby the clutch sleeve 47 is guided for longitudinal sliding movement on the shaft section 37 and is biased by the spring 48 into coupling engagement with the clutch sleeve 46. However, when the portion of the tractor comprising the frame bars 18 and 19 is elevated, as by the hydraulic elevating mechanism of the tractor, the shaft section 37 is likewise elevated and pulls the clutch sleeve 47 out of engagement with the clutch sleeve 46, since the pin 50 engages the end of the slot 51, whereby the shaft section 37 is uncoupled from the sleeve 45 and is hence uncoupled from the power takeoff shaft of the tractor.

Secured to the plate member 15 around the upstanding circular stud 21 are a plurality of L-shaped brackets 54 having the upstanding arms 52. For example, as shown in Figure 3, four brackets 54 are employed, the brackets being spaced 90° from each other and being located symmetrically on opposite sides of the transverse axis of the shaft 30.

Designated at 55 is a conical hopper, to the lower portion of which is secured a cylindrical skirt member 56 which is received inwardly adjacent to and is adjustably supported on the upstanding arms 52. Thus, as shown in Figure 1, the skirt member 56 is formed with the respective inclined slots 57 through which extend respective fastening bolts 58, said fastening bolts extending through the top portions of the arms 52 and being provided with respective wing nuts 59, whereby the hopper 55 may be adjustably supported on the arms 52, and whereby the height of the hopper 55 may be varied by loosening the wing nuts 59, by rotating the hopper 55 around its vertical axis, and by then again tightening the wing nuts 59.

As shown in Figure 1, the open, relatively small bottom end of the hopper 55 is located concentrically with and above the circular trough 22, and the elevation of the open bottom end of the hopper 55 may be adjusted by adjusting the elevation of the hopper in the manner above described. The adjustment of the open lower end of the hopper is in accordance with the consistency of the material to be distributed by the device.

Designated at 60 is an obliquely positioned baffle member which is suitably secured to the hopper 55, as by being provided with an arm 61 pivotively connected by a horizontal rivet 62 to the lower marginal portion of the skirt member 56, the baffle member 60 being thus supported in an oblique position in the outer portion of the trough 22, as shown in Figure 4.

As shown in Figure 4, the baffle member 60 has a straight bottom edge which slidably engages the surface of the bottom wall of the circular trough member 22 adjacent the upstanding outer peripheral flange 63 of the trough, the baffle member 60 being directed obliquely, as above mentioned, and being arranged so that the material discharging from the hopper 55 onto the inner portion of the circular trough 22 will be deflected laterally and will be elevated above and outwardly from the peripheral flange 63 of the trough responsive to rotation of the trough.

Designated at 65 is a discharge conduit which is secured in any suitable manner to the frame 12 laterally adjacent the baffle member 60, said conduit being provided with the upwardly flaring intake member 66 arranged to receive the material deflected laterally from the trough 22 by the baffle member 60.

In operation, as the trough 22 is rotated, the material, such as fertilizer or the like, is discharged on the inner portion of the trough member 22 and spreads outwardly on the trough member being deflected laterally upwardly and outwardly by the baffle member 60 into the upwardly flaring intake member 66, and thence downwardly through the conduit 65 for discharge onto the ground.

Although in the specific embodiment of the invention above described and illustrated in the drawings, a baffle member 60 and a discharge conduit 66 is provided on only one side of the device, a similar baffle member 60 and discharge conduit 66 may be also provided on the opposite side of the trough member 22. Furthermore, additional similar baffle members 60 and discharge conduits 66 may be provided at spaced points around the trough member, for example, the device may be provided with as many as four baffle members and discharge conduits.

The above described material spreader may be used on any make of tractor having a power takeoff drive shaft.

While a specific embodiment of an improved material spreading attachment for a farm tractor has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A material spreader attachment for a farm tractor comprising a frame, a horizontal trough rotatably mounted on said frame, a hopper disposed over said trough, said hopper having a tapering open bottom end, a skirt member secured to said hopper above said bottom end, a plurality of upstanding arms rigidly secured on said frame and extending adjacent said skirt member, means adjustably securing said skirt member to said arms, whereby the height of said bottom end over said trough may be adjusted, a baffle member pivotally secured to said skirt member for free rotation on a substantially horizontal axis and extending obliquely into the outer marginal portion of and slidably engaging the bottom wall of said trough, and a depending discharge conduit secured to said frame laterally adjacent said baffle member and being arranged to receive material deflected laterally from said baffle member responsive to rotation of said trough.

2. A material spreader attachment for a farm tractor comprising a frame, a horizontal circular trough rotatably mounted on said frame, a hopper disposed over said trough, said hopper having a tapering open bottom end, a skirt member secured to said hopper above said bottom end, a plurality of upstanding arms rigidly secured on said frame and extending adjacent said skirt member, said skirt member being formed with parallel inclined slots arranged adjacent the respective arms, respective fastening bolts extending through the arms and the respective inclined slots, whereby the height of said bottom end over said trough may be adjusted, a baffle member pivotally connected to said skirt member for free rotation on a substantially horizontal axis and extending obliquely into the outer marginal portion of and slidably engaging the bottom wall of said trough, and a depending discharge conduit secured to said frame laterally adjacent said baffle member and being arranged to receive material deflected laterally from said baffle member responsive to the rotation of said trough.

References Cited in the file of this patent

UNITED STATES PATENTS

| | | |
|---|---|---|
| 1,185,242 | Reading | May 30, 1916 |
| 1,934,899 | White | Nov. 14, 1933 |
| 2,550,872 | Shaw | May 1, 1951 |
| 2,672,259 | Hobgood | Mar. 16, 1954 |